United States Patent
Cetin et al.

(10) Patent No.: US 10,419,499 B2
(45) Date of Patent: *Sep. 17, 2019

(54) METHOD AND SYSTEM FOR APPLICATION SECURITY EVALUATION

(71) Applicant: Swisscom AG, Bern (CH)

(72) Inventors: Feride Cetin, Bern (CH); Torben Rühl, Ostermundigen (CH)

(73) Assignee: SWISSCOM AG, Bern (CH)

( * ) Notice: Subject to any disclaimer, the term of this patent is extended or adjusted under 35 U.S.C. 154(b) by 84 days.

This patent is subject to a terminal disclaimer.

(21) Appl. No.: 15/602,951

(22) Filed: May 23, 2017

(65) Prior Publication Data

US 2018/0020029 A1 Jan. 18, 2018

Related U.S. Application Data

(63) Continuation of application No. 13/683,065, filed on Nov. 21, 2012, now Pat. No. 9,661,038.

(30) Foreign Application Priority Data

Nov. 21, 2011 (EP) .................................... 11189944

(51) Int. Cl.
*H04L 29/06* (2006.01)
*H04W 4/50* (2018.01)
(Continued)

(52) U.S. Cl.
CPC ............ *H04L 65/40* (2013.01); *G06F 21/552* (2013.01); *G06F 21/566* (2013.01); *G06F 21/57* (2013.01);
(Continued)

(58) Field of Classification Search
CPC ..... H04L 65/40; H04L 63/145; G06F 21/577; G06F 11/36; G06F 21/50–577; H04W 12/12; H04W 12/02

See application file for complete search history.

(56) References Cited

U.S. PATENT DOCUMENTS 8,655,336 B1    2/2014  Dempski et al.
2003/0163770 A1  8/2003  Webster et al.
(Continued)

OTHER PUBLICATIONS

XP007920093, "iTunes ist die einfachste Moglichkeit, digitale Medien in Ihre Sammlung aufzunehmen und zu verwalten" Internet Citation, Nov. 8, 2012.

(Continued)

*Primary Examiner* — Arvin Eskandarnia
(74) *Attorney, Agent, or Firm* — McAndrews, Held & Malloy, Ltd.

(57) ABSTRACT

Methods and systems are provided for evaluating feedback relating to applications running on mobile device and updating information relating to the applications. User feedback messages may be received from mobile communication devices, with the user feedback messages comprising information associated with one or more applications operable on the mobile communication devices. Based on the user feedback messages, an application may be selected, with the selecting comprising computing a most likely application to match at least one parameter in user feedback messages. A classification parameter of the selected application may be determined, such as based on evaluating one or more operating characteristics of the selected application. The classification parameter may be provided to a mobile communication device and/or a server system, to enable the mobile communication device to identify application(s) matching the selected application, and/or to enable the server system to operate application(s) matching the selected application.

24 Claims, 1 Drawing Sheet

(51) Int. Cl.
*H04W 12/12* (2009.01)
*G06F 21/57* (2013.01)
*G06F 21/56* (2013.01)
*G06F 21/55* (2013.01)
*G06F 11/36* (2006.01)

(52) U.S. Cl.
CPC .......... *G06F 21/577* (2013.01); *H04L 63/145* (2013.01); *H04W 4/50* (2018.02); *H04W 12/12* (2013.01); *G06F 11/36* (2013.01)

(56) References Cited

U.S. PATENT DOCUMENTS

| | | | |
|---|---|---|---|
| 2003/0236087 A1* | 12/2003 | Stenton | H04M 15/70 455/418 |
| 2004/0003325 A1 | 1/2004 | Muller et al. | |
| 2006/0041687 A1* | 2/2006 | Caspi | G06Q 10/10 709/248 |
| 2006/0278694 A1 | 12/2006 | Jha et al. | |
| 2008/0086776 A1 | 4/2008 | Tuvell et al. | |
| 2009/0036111 A1 | 2/2009 | Danford et al. | |
| 2011/0047594 A1 | 2/2011 | Mahaffey et al. | |
| 2011/0047597 A1 | 2/2011 | Mahaffey et al. | |
| 2011/0047620 A1 | 2/2011 | Mahaffey et al. | |
| 2011/0145920 A1 | 6/2011 | Mahaffey et al. | |
| 2012/0278194 A1* | 11/2012 | Dewan | G06F 11/0742 705/26.1 |
| 2013/0111592 A1 | 5/2013 | Zhu et al. | |

OTHER PUBLICATIONS

European Search Report, dated Feb. 22, 2012, European Application No. EP11189944.

* cited by examiner

US 10,419,499 B2

METHOD AND SYSTEM FOR APPLICATION SECURITY EVALUATION

CLAIM OF PRIORITY

This patent application is a continuation of U.S. patent application Ser. No. 13/683,065, filed Nov. 21, 2012, which in turn pursuant to 35 U.S.C. § 119 claims the filing date benefit of and right of priority to European Patent (EP) Application Serial No. 11189944.9, filed Nov. 21, 2011.

Each of the above identified applications is hereby incorporated herein by reference in its entirety.

FIELD OF THE INVENTION

The present invention relates to the field of applications for mobile electronic devices, and in particular to applications, commonly referred to as apps, which can be downloaded and installed on personal devices such as smartphones. More specifically, certain embodiments of the invention relate to methods and systems for application security evaluation.

BACKGROUND OF THE INVENTION

The use of devices such as smartphones is increasing rapidly. Such devices may be capable of running mobile applications which may provide easy access to information and services that may offered for both residential and business users. Many hundreds of thousands of applications are available to be downloaded from online application stores, or directly from developers' sites. However, these applications are of varying quality. In this regard, many applications may be inefficiently or inexpertly written, and some may even be deliberately malicious. Because of the large numbers involved, the providers of the application stores have found it difficult or impossible to verify the integrity of all the applications on offer. The task of verifying the applications' security has proved particularly onerous. The evaluation of applications may be carried out on the basis of information provided by the author of the application, and by analyzing the application source code, again provided by the author. However, there is no guarantee that the application source code provided by the author corresponds exactly to the application which is being offered for inclusion in the application store, or which is available for download from the developer's site. The author may be motivated to provide misleading or fraudulent information to an application store, which may pass undetected.

European Patent Application EP1892620 and US Patent Application US 2008/046886 describe auditing methods for mobile phone applications which aim to protect the potential user of an application by informing the user of which "permissions" the application requests. This permissions information is made available in the course of the installation of the application, and the user may be offered the choice of refusing some of these permissions and thereby limiting the functional parameters of the application, or blocking the installation of the application entirely. However, such methods rely on the user, or the operating system of the mobile phone, to be equipped with knowledge about which permissions it is advisable to permit the application to request. A further disadvantage of these methods as that the permissions information only becomes available once the user has selected the application for downloading and installation. While the permissions information is useful in evaluating the 15 security of an application, it is not normally possible for users, even with assistance provided by the operating system of the mobile phone, to make an informed decision about the security of the application in question.

Another disadvantage of prior art systems is that a user who is confronted with a malfunction of his or her mobile device cannot easily differentiate between problems with the hardware, the operating system, a single application, or a conflict between applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for application security evaluation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the invention will become apparent from the following description of non-limiting exemplary embodiments, with reference to the appended drawings, in which.

DETAILED DESCRIPTION OF THE INVENTION

Figure 1:
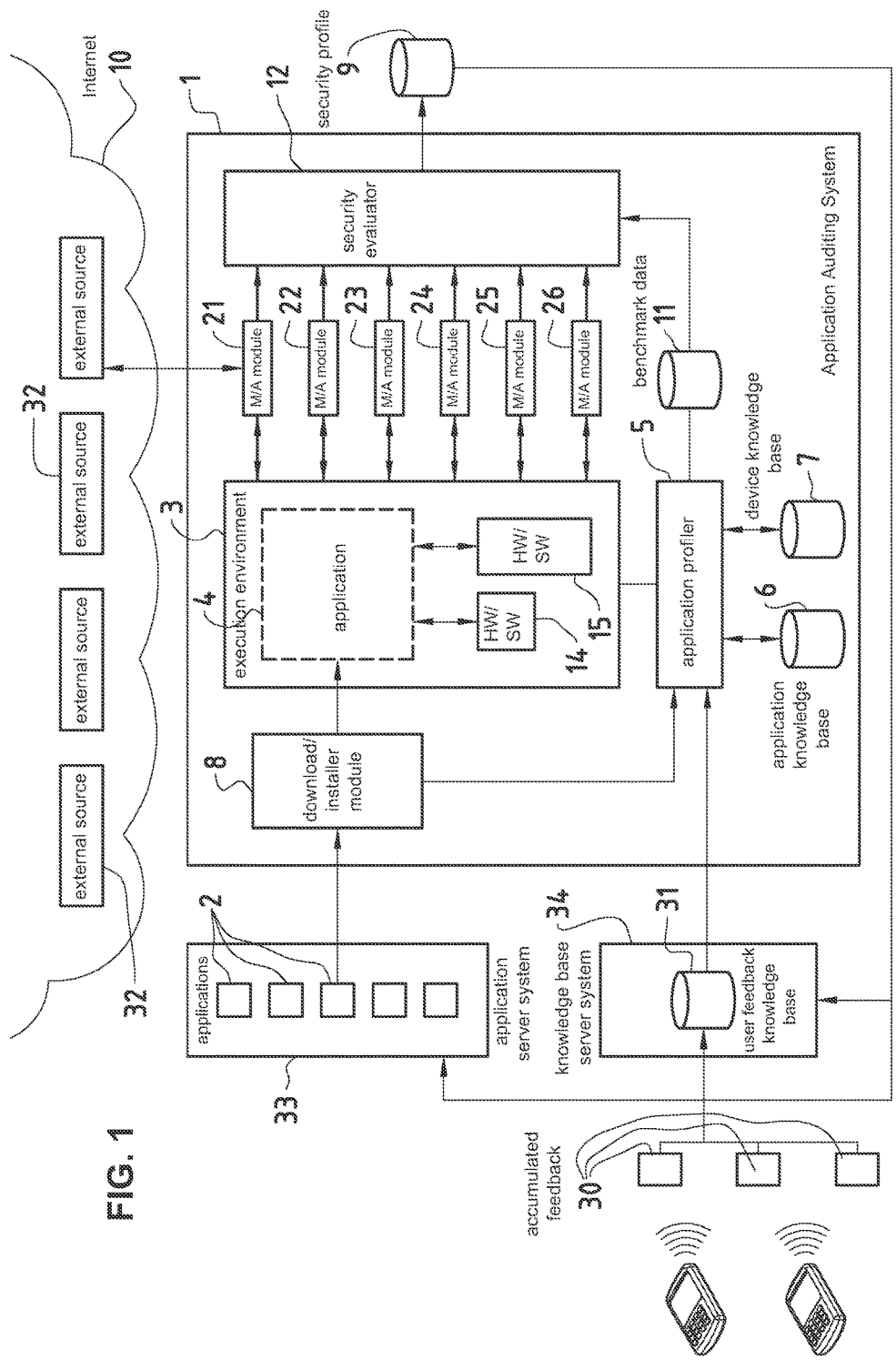
FIG. 1 illustrates an example implementation of a system, in accordance with an embodiment of the invention.

Certain embodiments of the present invention may be found in a method and system for application security evaluation, as described in the following in more detail with reference to the attached figures.

In various implementations, a method may be used in evaluating user feedback of mobile communication device applications. The method may comprise: receiving, at a first server system, a plurality of user feedback messages from a plurality of mobile communication devices, the plurality of user feedback messages comprising information associated with one or more applications operable on the plurality of mobile communication devices; selecting, based on the plurality of user feedback messages, one of the one or more operable applications; determining a classification parameter of the selected operable application based on evaluating one or more operating characteristics of the selected operable application; communicating the classification parameter to one or more of the plurality of mobile communication devices; and communicating the classification parameter to an application evaluation database on a second server system.

In various implementations, a system may be configured for evaluating user feedback of mobile communication device applications. The system may comprise: a first interface for receiving a plurality of user feedback messages from a plurality of mobile communications devices, the user feedback messages comprising application information of one or more applications operable on the plurality of mobile communications devices, a selector for selecting, based on the user feedback messages, one of the one or more operable applications, an evaluator for evaluating one or more operating characteristics of the selected operable application, a classifier for determining a classification parameter of the selected application based on results of the evaluation, second interface for communicating the classification parameter to the one or more mobile communications devices, and a third interface for communicating the classification parameter to an application evaluation database on a second server system.

The plurality of user feedback messages associated with the one or more applications operable on the plurality of mobile communication devices may comprise a problem type and at least one of a version identifier, a certificate identifier, an installation date and/or time, or a usage date and/or time associated with the one or more operable applications. The problem type may be one of spam, phishing, suspicious user data request, inappropriate content, or phone functionality problem. In an embodiment of the invention, the selecting of the operable application may be based on at least the problem type. The selecting may be based on, for example, computing a most likely application to cause the problem type from the one or more operable applications, where the computing may be based on the user feedback messages associated with the one or more operable applications. In some instances the most likely application to cause the problem type may be computed, such as by forming, for example, a weighted average of the at least one of a version identifier, a certificate identifier, an installation date and/or time, or a usage date and/or time associated with the one or more operable applications.

The selected application may be operated on the first server system to obtain the one or more operating characteristics of the selected operable application. In some instances, the operating of the selected application may be achieved via a script. The script may comprise, for example, code to operate selected functionalities of the selected application. In some instances, the script may comprise code to operate every functionality of the selected application. The script may be generated automatically from a functionality tree associated with the selected application. In this regard, the functionality tree, also known as a function tree, may be drawn up by developers of an application to specify and/or manage functional dependencies of functions of the application. This is particularly useful in developing and/or debugging more complex applications. Thus the same dependency information contained in the functionality tree can also be used for automatically generating the script whose task it is to operate every functionality of the selected application.

In some instances, the usage parameters of at least one resource used in the operating of the selected application may be determined. In this regard, the at least one resource may comprise at least one of data received, data transmitted, camera usage, battery usage, network usage, telephone functionality usage or Short-message Service usage. In some instances, a type of data accessed, generated, transmitted or otherwise used in the operating of the selected application may be determined.

The first server system may be adapted to run the selected operable application and thereby produce the one or more characteristics of the selected operable application.

In an example scenario, a user may experience undesirable behavior on the user mobile device, which may be caused by one or more mobile applications. For example, the phone may react sluggishly, there may be an increase in spam, there may be strange requests for data connections, or strange requests for passwords, pop-up advertisements, etc. However, the user may be unaware of which software or hardware of their mobile device causes the undesirable behavior. By initiating a user feedback message broadly defining the problem (e.g., "spam"), optionally with information describing the prevailing operating conditions of the device (e.g., device model, operating system, list of installed software, software version, date installed, date last used etc.) to a server system. A server system may aggregate such user feedback messages and evaluate the messages dependent on the problem type. For example, user feedback messages to the broad problem of "spam" in a knowledge base may be mined for commonalities. For example, the server system may automatically compare a list of installed applications, usage times etc. and, by applying appropriate algorithms, decide on which might be the most likely culprit application(s). The server system may install and run one of more of the potential culprit applications, for example in a device emulator on the server with dummy data, and may record and/or monitor the kind of data requests, data access, information received and transmitted etc. Based on the outcome of this analysis, the application under analysis can be classified as safe, suspicious, unsafe, etc. Once a classification has been made, the reporting mobile device user(s) can be informed, and may be given the option to upgrade, remove, or retain the classified application if it is a likely cause of the type of problem reported. In addition, the classification generated can be used to notify the developer, and update download servers or servers offering application ratings. In this way, users can benefit from other users' feedback to discover problematic applications, which they would not able be to identify on their own, due lack of time, or awareness, or technical expertise or equipment.

An advantage of one method and system of the invention is that it may provide a fully automated classification of software; a classification which is objective, and which prevents malicious users from influencing application ratings maliciously.

Another advantage of one method and system of the invention is that the developer may receive feedback concerning hacked or otherwise compromised software, including badly implemented or insufficiently tested software, and can take rectifying action quickly.

A method according to aspects of the invention may enable mobile device applications to be audited for security according to a predetermined set of security classification criteria, and in dependence upon user feedback data. Mobile applications are evaluated, for example, according to the audit test criteria detailed below, following which a security rating may be allocated to the application (for example Unsafe, Suspicious, Safe or Safe Premium), together with an easy-to-understand explanation of the reasons for the security rating. Users may thus be given a clear indication of the security of the mobile application (security rating) and, based on this rating, users who have not yet installed the application on their mobile device can decide whether or not to install it, while users who have already installed the application can decide whether or not to remove it from their mobile device.

The author of an application can also use the security audit profile, including, for example, the more detailed audit test results, to understand the security rating of their application, and thereby to determine problems and weaknesses with the application, as well as the risks associated with these problems and weaknesses. The audit results can also be accompanied by recommendations for the author to aid in improving the security of the mobile application. Application authors can thus better understand the security level of their applications and improve them based on the security audit report generated by a system and method according the invention.

The static analysis of applications known in the prior art typically requires access to the source code of the application. One method of the invention, on the other hand, instead of (or as well as) analyzing the intended or declared characteristics of the application, observes the actual functioning and behavior of the application as it executes, together with the actual data which is used, transmitted or received by the application or by the mobile device under control of the application. Thus one method of the invention does not necessarily require any access to the source code of the application in order to allocate a meaningful security rating.

FIG. 1 illustrates an example implementation of a system, in accordance with an example embodiment of the invention. In this regard, it is understood that the FIGURE is provided by way of illustration only, and should not be construed as limiting the scope of protection sought.

Referring to FIG. 1, there is shown a functional relationship between an application auditing system 1, a plurality of applications 2 hosted on application server system 33 (which may also host an application evaluation base), a user feedback database 31 hosted on a first knowledge base server system 34, and third party entities 32, connected for example via the internet 10.

The application auditing system 1 may comprise any suitable logic, circuitry, interfaces, and/or code for implementing various aspects of the invention. In this regard, the application auditing system 1 may be configured to generate an application security profile 9 for a particular application 2, referring to one or more knowledge bases (e.g., bases 6, 7, 31) and monitoring communication with third-party entities 32.

The user feedback knowledge base 31 may comprise accumulated feedback 30 from mobile device users. Such feedback 30 may include, for example, user reports of problems associated with installation and/or running of the various applications 2, and may also include information about the operating conditions (such as type of mobile device, operating system, other applications installed, processes running in the mobile device) which may have prevailed at the time the problem arose. The user feedback data 30 accumulated in the user feedback knowledge base 31 may be used by the auditing system (e.g., the application auditing system 1, being obtained from the first knowledge base server system 34 via appropriate interface(s) in the application auditing system 1 for example) as data of unknown quality, to be treated in statistical fashion, with the significance of particular types of user feedback reports being dependent for example on their coherence and frequency of occurrence.

An application knowledge base 6, which may be hosted on the application auditing system 1 itself for example, may comprise predetermined (trusted) data describing actual (known) characteristics of the applications 2, for example an application's standard (expected) functioning on certain devices or under predetermined conditions. Similarly, a device knowledge base 7 may comprise trusted data relating to actual (known) characteristics of mobile devices (e.g., smartphones), for example the functioning of the devices under predetermined conditions. The device knowledge base 7 may also comprise information describing characteristics of various operating systems which may run on the mobile devices.

An example of a security audit is described herein. It is understood that this example is non-limiting and given merely as an illustration of a possible realization of the method and system of the invention. An application 2 for which the security audit is to be performed may be downloaded and/or installed, such as using a download/installer module 8, in an application execution environment 3 running on the application auditing system 1. In this regard, the download/installer module 8 may comprise any suitable logic, circuitry, interfaces, and/or code for importing and/or installing applications. The execution environment 3 may be a dedicated hardware- and/or software-implemented rig for emulating the application execution environment of a mobile phone, for example. The execution environment 3 may also be a commercially available mobile device, such as a smartphone, to which the various monitoring and security analyzers are connected (e.g., wired connectors and/or wirelessly), or on to which they are installed as software components.

The application auditing system 1 may select, via the download/installer module 8 for example, a particular application (referenced as application 4 hereinafter once it is installed and run in the execution environment 3), such as a particular one of the plurality of applications 2 hosted on the application server system 33, based on various criteria or parameters. For example, the application auditing system 1 may select (e.g., via the download/installer module 8) the application 4 based on the user feedback database 31. In this regard, user feedback associated with the plurality of applications 2 may comprise particular information that may be used in the selection. For example, the user feedback may comprise, with respect to the applications, such application related information as a problem type, a version identifier, a certificate identifier, an installation date and/or time, and/or a usage date or time associated with the application(s). The problem type may be, for example, one of spam, phishing, suspicious user data request, inappropriate content, phone functionality problem, and the like. In some instances, the selecting of the application (e.g., application 4) may be based on at least the problem type. For example, the application selection may be based on computing a most likely application to cause the problem type from the applications 2 (hosted on server 33), in accordance with, for example, pertinent user feedback associated with the applications. In some instances, the most likely application to cause the problem type may be computed by forming, for example, a weighted average of the at least one of a version identifier, a certificate identifier, an installation date and/or time, or a usage date and/or time associated with the application(s).

In some instances, running applications in the application auditing system 1 (e.g., within the execution environment 3) may achieved by use of script(s). In this regard, the script(s) may comprise code for operating or running selected functionalities of the selected applications (e.g., application 4). In some instances, the script(s) may be configured to run every functionality of the selected application. The script may be generated automatically from a functionality tree associated with the selected application.

In some instances, applications tested in application auditing system 1 (e.g., the application 4) may be monitored while running, executing or operating in the execution environment 3, such as to enable obtaining, gathering, and/or collecting various data related to the application 4. For example, running the application 4 may enable obtaining or determining operating characteristics of the application 4. In some instances, monitoring running of a tested application (e.g., the application 4) may comprise obtaining, gathering, and/or determining usage parameters of at least one resource used in the operating of the application.

Examples of resources that may be pertinent to running applications may comprise, for example, received and/or transmitted data, camera usage, battery usage, network usage, telephone functionality usage or Short-message Service (SMS) usage.

For example, a plurality of monitoring and/or analyzing modules 21 through 26 may be used to monitor or analyze the functions, data and communication of the application under analysis (e.g., the application 4) as it is being executed in the execution environment 3. The monitoring and/or analyzing modules (21-26) may comprise any suitable logic, circuitry, interfaces, and/or code for performing monitoring and/or analysis of applications. For example, the monitoring and/or analyzing modules may be hardware elements (sensors, recording devices etc.) or software elements for monitoring predetermined functions and/or communications. The results of this monitoring and analysis may be output to security evaluator 12 as individual security parameters, each representing a security level of the various functions, data and communications of the application 4, as is described below.

The security evaluator 12 may comprise any suitable logic, circuitry, interfaces, and/or code for performing security analysis of applications. The security evaluator 12 may, for example, collate the various security parameters in order to generate security profile 9, which represents a security rating for the application 4 under test. The security profile 9 optionally may also comprise more detailed security evaluation information to supplement the security rating. The security rating may be expressed as a security classification based on a weighted summarizing of the various security parameters (weighted for example by the extent of the risk and hazard of the respective security parameters, according to risk and hazard data from one or more of knowledge bases 31, 6 and/or 7). Once generated (and/or updated, such as after a re-analysis or re-evaluation), the security profile 9 may be used in updating related systems or databases. For example, the security profile 9 may be used in updating pertinent components of the application auditing system 1 (e.g., the application knowledge base 6 and/or the device knowledge base 7), and/or may be communicated to entities external to the application auditing system 1, such as to user mobile devices, the application server system 33, and/or to the knowledge base server system 34, for use therein (e.g., in updating local information maintained or used therein, such as the user feedback database 31).

The security evaluator 12 may also use benchmark data 11, provided by application profiler 5, to evaluate the various security parameters. Benchmark data 11 may represent predetermined benchmark ("normal" or "expected") values or ranges of values for the various security parameters, example for a particular type of applications. For example, benchmark data 11 may specify values, or ranges of values, of security parameter data for the particular type of application 4 under test, and for the particular type of execution environment 3 being used, which indicate whether a particular security classification can be regarded as "suspicious" or "safe", for example. Alternatively, the benchmark data 11 can be expressed as risk/hazard data associated with particular security parameters, for the particular type of application 4 under test, and for the particular type of execution environment being used. The risk and hazard parameters described herein are given by way of example only, as an example of concise and meaningful security evaluation parameters. Other, more complex, parameter sets, however, may also be used to populate the application knowledge base 6 and the mobile device knowledge base 7.

An application profiler 5 may be utilized in profiling applications, including audited applications for example. In this regard, the application profiler 5 may comprise any suitable logic, circuitry, interfaces, and/or code for performing the required profiling related operations or functions. For example, the application profiler 5 may be configured to receive security and other information about the application under test from several sources in order to generate benchmark data 11. The download/installer module 8, for example, may provide information from the installation process, such as information about which hardware/software elements (14, 15), for example of the mobile device represented by the execution environment 3, were required or requested during the installation of the application. The download/installer module 8 may also receive security information and/or functional definition data of application 4 from server 33 (via appropriate interface(s) in the application auditing system 1 for example), such as permissions or access request data, which are then, if available, supplied to application profiler 5. The data may also be, if available, provided by the download/installer module 8 to the security evaluator 12, for use in assessing the permissions or access request data, for example, against corresponding benchmark data 11. For example, benchmark data 11 may be compiled from information stored in knowledge bases 6, 7 and/or 31, which may include a specification of which permissions, for a specified operating system (execution environment), might reasonably be required for a particular type of application. This benchmark information may be used by the security evaluator 12 to detect any permissions or access requests in the information provided by download/installer module 8 which are not needed by a specified type of application, or which otherwise raise suspicions of a security breach.

The application profiler 5 may also use the downloaded information supplied from download/installer module 8 to determine the type of the application being audited, and/or for generating the benchmark data 11. The application knowledge base 6 may provide the application profiler 5 with security and functional description information of a plurality of types of application, and mobile device knowledge base 7 may provide the application profiler 5 with security and functional description information of a plurality of types of mobile device, and/or a plurality of types of mobile device operating system.

Described in general terms, the application profiler 5 may generate benchmark data 11 which may set out the expected values, or ranges of values, of the security parameters, generated by the various monitoring/analyzing module 21 to 26 for example. The benchmark data 11 preferably may be generated in subdivisions which specify degrees of security of the various security parameters, generated for the particular type of application 2 and/or for the particular type of mobile device represented by the execution environment 3.

For example, the application knowledge base 6 may include data records containing details of which permissions might reasonable be requested by different types of application 2. Almost any application 2 which requests access to the "Brick" function of a mobile phone—that is the function that may renders the phone unusable, for example, could have risk and hazard values of "high" and "high" respectively, and/or a security classification of "Unsafe". Very few applications 2 would have a bona fide reason for requesting access to the "Brick" function, which means that most applications which request this function are allocated a high hazard value, because the potential damage is great (unusable phone), and a high risk value, because any application 2 which requests such a function without good reason automatically falls under suspicion of being malicious. Thus, almost all records in the application knowledge base 6 which relate to applications 2 which request the "Brick" function would contain these maximum values for risk and hazard, and/or an "Unsafe" security classification. The exceptions would be those applications 2 with a bona fide reason for requesting permission to use the "Brick" function.

Other records in the application knowledge base 6, on the other hand, may contain significantly different values of risk/hazard/security classification for different types of applications. For example, an application whose declared purpose is to synchronize a user's passwords and other private data with a remote server may have an application type "PDA synch", which may have a low risk value and a medium hazard value for the function "Outputting private data". In this case, a low risk value might be stored in the knowledge base 6 because the function "Outputting private data" is compatible with the declared purpose of the application 2. On the other hand, a medium hazard value might be stored because, although the risk of a security breach is low, the potential damage which could be caused by a security breach is not low (disclosure of user's account login details, for example). In some instances, many knowledge base records might be required for the function "Outputting private data", further sub-classified depending on the type of private data (contact data, passwords, browser bookmarks etc.), and depending on the level/type of encryption used when outputting the data. For example, such knowledge base records may be used, such as in the form of benchmark data 11, by the security evaluator 12 to evaluate the encryption status parameter which represents the real encryption behavior of the application 4 under test, as monitored by encryption status monitoring module 24.

In some instances, with sufficiently detailed data in the knowledge bases 6, 7 and 31, most or all of the functions of the application auditing system 1 may be implemented as automated processes, rapidly and without the need for intervention by an operator or system administrator. Accordingly, it may be possible to perform security rating processing on a large number of applications 2 in an existing library (e.g., an application evaluation database in the server 33), for example, or to process a high throughput of incoming applications 2, and/or to process high numbers of user feedback reports, to give quick analysis information about the security of each new application 2 as application information is added to the knowledge bases (e.g., bases 6, 7, and 31). Classification and evaluation information of each application 2 and/or each device or operating system can also be fed back into the knowledge bases 6, 7, 31, optionally with input from moderators, to constantly improve the range, accuracy and resolution of the knowledgebase contents.

Once the number of received user feedback reports relating to a particular application 2 (and/or a particular device or operating system) exceeds a certain threshold, for example, or the user feedback reports exceed a particular statistical significance value (for example in relation to the number of times the application concerned has been downloaded by users), the security evaluator 12 may automatically be triggered to re-analyze the application concerned, and to generate a revised security rating for it, which may then be fed back to user feedback knowledge base 31 and/or application server 33, thereby generating a reclassification of the application 2 in the light of the increased number or significance of user-generated feedback reports in the user feedback knowledge base 31. A re-evaluation and re-classification of an application 2 may also be triggered when a new version or an update of the application 2 is released and made available on server 33, for example.

Tests which may be monitored to evaluate an application's security include performance tests, in which physical quantities, such as power consumption, display contrast/intensity, processor usage and/or call capabilities are measured using physical sensors, and/or by monitoring the application 4 installed in the execution environment 3. Content checks may be performed, for example on internet content which is accessed by the application 4 under analysis and/or which is displayed or otherwise communicated by the application 4 to the user, in order to identify content which violates predetermined content suitability policies, which may for example be specified in the benchmark data 11.

Content checks can be carried out by communication behavior monitoring module 21. The communication behavior monitoring module 21 may comprise any suitable logic, circuitry, interfaces, and/or code for monitoring data and communication with external sources 32, for example via the internet 10.

Privacy analysis may be performed by communication behavior monitoring module 21, which can monitor data traffic to and from the application 4 under analysis, or execution environment 3, while the application 4 is executing, for example by analyzing the transmitted user data and/or by identifying the parties to whom the user data is transmitted, and/or by determining what, if any, security measures are applied by the application 4 under analysis to protect user data during transmission. The monitoring results are used to generate a communication behavior security parameter which may then subsequently be compared, by security evaluator 12, with benchmark privacy data 11, which may be derived from the application's declared privacy parameters as supplied, if available, from the download/installer module 8, or from equivalent information stored in application knowledge base 6 for the particular type of application 4 under test.

Data traffic analysis may also be performed by the communication behavior monitoring module 21, for example including the monitoring of data transmitted from the mobile device, or execution environment 3, to identify any sensitive application data (login name, password, session ID, etc.) which is transmitted by the application, in order to identify the parties receiving such sensitive application data, and/or to identify which security measures, if any, are applied to protect the application data during transmission. The quantity of data transmitted and/or received by the application may also be monitored during the execution of the application 4 under analysis. The monitoring results may then be used to generate a communication behavior security parameter which can subsequently be compared, by the security evaluator 12, with benchmark traffic data 11, which may be derived by the application profiler 5 from benchmark application traffic data stored in application knowledge base 6 for the particular type of application 4 under test. Inappropriate types of data, or unexpectedly large quantities of transmitted or received data, for example, can be detected when the measured data traffic quantities fall outside the ranges specified in the application knowledge base 6 for the particular application 4 under test.

Control behavior monitoring module 22 may comprise any suitable logic, circuitry, interfaces, and/or code for monitoring access which the application under analysis makes, or attempts to make, to hardware and/or software functions 14, 15 of the execution environment 3, and for generating a control behavior parameter which is subsequently compared against benchmark data 11 for the particular type of application 4 and the particular characteristics of the emulated execution environment 3. For example, a game application may reasonably be expected to access graphics functions, audio output and vibrator control, but not to read or write contacts to/from the users address book, or to use the camera or send application data by SMS, for example. Vulnerability analysis may be performed by a vulnerability determining module 26. The vulnerability analysis module 26 may comprise any suitable logic, circuitry, interfaces, and/or code for performing vulnerability analysis during installation or execution of the application 4 under analysis in the execution environment 3.

The vulnerability determining module 26 may effect or simulate one or more types of hack attempt, such as man-in-the-middle (MITM) attacks or code injection, and/or analyze the application's response to such attacks in order to identify any weaknesses in the application's defenses. The specific attacks are chosen depending on the type of the application 4 under analysis. One system and method of the invention, by applying consistent audit processes to applications, with no or minimal operator intervention, ensures a rapid and consistent audit and security classification of applications based on well-defined predetermined criteria. Application authors and users are thus able more easily to understand the security rating of a mobile application which has been audited using this system or method.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present invention may be realized in hardware, software, or a combination of hardware and software. The present invention may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   receiving by a server system, a plurality of user feedback messages from one or more mobile communication devices, wherein the plurality of user feedback messages comprises information associated with one or more applications operable on the one or more mobile communication devices;
   selecting, based on the plurality of user feedback messages, one of the one or more applications, wherein the selecting comprises computing a most likely application from the one or more applications to match at least one parameter in the plurality of user feedback messages; and
   determining a classification parameter of the selected application based on evaluating one or more operating characteristics of the selected application.

2. The method of claim 1, wherein the at least one parameter in the plurality of user feedback messages comprises a problem type.

3. The method of claim 2, wherein the problem type comprises one of spam, phishing, suspicious user data request, inappropriate content, or phone functionality problem.

4. The method of claim 1, comprising computing the most likely application based on a weighted average of one or more other parameters in the plurality of user feedback messages.

5. The method of claim 4, wherein the one or more other parameters in the plurality of user feedback messages comprise one or more of a version identifier, a certificate identifier, an installation date and/or time, and a usage date and/or time associated with the one or more applications.

6. The method of claim 1, comprising operating the selected application on the server system to obtain the one or more operating characteristics of the selected application.

7. The method of claim 6, comprising operating the selected application using a script.

8. The method of claim 7, comprising generating the script automatically from a functionality tree associated with the selected application.

9. The method of claim 1, comprising determining usage parameters of at least one resource used in operating the selected application, the at least one resource comprising one or more of data received, data transmitted, camera usage, battery usage, network usage, telephone functionality usage and Short-message Service usage.

10. The method of claim 1, comprising determining a type of data accessed, generated, transmitted or otherwise used in operating the selected application.

11. The method of claim 1, comprising providing the classification parameter to at least one mobile communication device, the classification parameter being configured to enable the at least one mobile communication device to identify one or more applications that match the selected application.

12. The method of claim 1, comprising providing the classification parameter to a second server system, the classification parameter being configured to enable the second server system to operate one or more applications that match the selected application.

13. A system comprising:
   interfacing circuitry operable to receive a plurality of user feedback messages from one or more mobile communication devices, wherein the plurality of user feedback messages comprises information associated with one or more applications operable on the one or more mobile communication devices; and processing circuitry operable to:
select, based on the plurality of user feedback messages, one of the one or more applications, wherein the selecting comprises computing a most likely application from the one or more applications to match at least one parameter in the plurality of user feedback messages; and
determine a classification parameter of the selected application based on evaluating one or more operating characteristics of the selected application.

14. The system of claim 13, wherein the at least one parameter in the plurality of user feedback messages comprises a problem type.

15. The system of claim 14, wherein the problem type comprises one of spam, phishing, suspicious user data request, inappropriate content, or phone functionality problem.

16. The system of claim 13, wherein the processing circuitry is operable to compute the most likely application based on a weighted average of one or more other parameters in the plurality of user feedback messages.

17. The system of claim 16, wherein the one or more other parameters in the plurality of user feedback messages comprise one or more of a version identifier, a certificate identifier, an installation date and/or time, and a usage date and/or time associated with the one or more applications.

18. The system of claim 13, wherein the processing circuitry is operable to operate the selected application on the server system to obtain the one or more operating characteristics of the selected application.

19. The system of claim 18, wherein the processing circuitry is operable to operate the selected application using a script.

20. The system of claim 19, wherein the processing circuitry is operable to generate the script automatically from a functionality tree associated with the selected application.

21. The system of claim 13, wherein the processing circuitry is operable to determine usage parameters of at least one resource used in operating the selected application, the at least one resource comprising one or more of data received, data transmitted, camera usage, battery usage, network usage, telephone functionality usage and Short-message Service usage.

22. The system of claim 13, wherein the processing circuitry is operable to determine a type of data accessed, generated, transmitted or otherwise used in operating the selected application.

23. The system of claim 13, wherein the interfacing circuitry is operable to provide the classification parameter to at least one mobile communication device, the classification parameter being configured to enable the at least one mobile communication device to identify one or more applications that match the selected application.

24. The system of claim 13, wherein the interfacing circuitry is operable to provide the classification parameter to an application server system, the classification parameter being configured to enable the application server system to operate one or more applications that match the selected application.

* * * * *